US012382228B2

(12) United States Patent
Higgins et al.

(10) Patent No.: US 12,382,228 B2
(45) Date of Patent: Aug. 5, 2025

(54) HEARING DEVICE CABLE

(71) Applicant: Starkey Laboratories, Inc., Eden Prairie, MN (US)

(72) Inventors: Sidney A. Higgins, Maple Grove, MN (US); David Tourtelotte, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 18/369,575

(22) Filed: Sep. 18, 2023

(65) Prior Publication Data

US 2024/0007799 A1 Jan. 4, 2024

Related U.S. Application Data

(63) Continuation of application No. 17/546,702, filed on Dec. 9, 2021, now Pat. No. 11,778,391, which is a continuation of application No. 16/235,629, filed on Dec. 28, 2018, now Pat. No. 11,528,564.

(60) Provisional application No. 62/611,346, filed on Dec. 28, 2017.

(51) Int. Cl.
*H04R 25/02* (2006.01)
*H04R 25/00* (2006.01)

(52) U.S. Cl.
CPC ............. *H04R 25/02* (2013.01); *H04R 25/65* (2013.01); *H04R 25/70* (2013.01); *H04R 2225/0213* (2019.05)

(58) Field of Classification Search
CPC ........ H04R 25/02; H04R 25/65; H04R 25/70; H04R 2225/0213; H04R 2225/021
See application file for complete search history.

(56) References Cited

U.S. PATENT DOCUMENTS

| | | | |
|---|---|---|---|
| 2,545,731 | A | 3/1951 | French |
| 5,404,407 | A | 4/1995 | Weiss |
| 7,783,068 | B2 | 8/2010 | Klemenz |
| 8,374,376 | B2 | 2/2013 | Kurbis |
| 8,411,890 | B2 | 4/2013 | Ooi |
| 9,020,601 | B2 | 4/2015 | Meskens |
| 10,021,498 | B2 | 7/2018 | Kaminski |
| 2003/0002700 | A1 | 1/2003 | Fretz |

(Continued)

OTHER PUBLICATIONS

Extended European Search Report for Application No. 22180102.0-1207 dated Dec. 8, 2022, 10 pages.

(Continued)

*Primary Examiner* — Suhan Ni
(74) *Attorney, Agent, or Firm* — Mueting Raasch Group

(57) ABSTRACT

A hearing device cable including a body portion is described herein. The body portion may extend between a first end region and a second end region along a tube centerline. The body portion may include a first radial portion proximate the first end region and second radial portion proximate the second end region. The first radial portion may define a radius of curvature that is greater than or equal to a radius of curvature defined by the second radial portion. The tube centerline may lie along an x-y plane between the first and second end regions. In one or more embodiments, the body portion may define a passageway extending between the first and second end regions. Further, the hearing device cable may include a superelastic wire within the passageway extending between the first and second end regions.

20 Claims, 11 Drawing Sheets

(56) References Cited

U.S. PATENT DOCUMENTS

| | | | |
|---|---|---|---|
| 2006/0023909 | A1 | 2/2006 | Grafenberg |
| 2008/0247590 | A1 | 10/2008 | Sun |
| 2009/0087006 | A1 | 4/2009 | Leong |
| 2010/0104126 | A1 | 4/2010 | Greene |
| 2011/0135131 | A1 | 6/2011 | Winther |
| 2012/0014547 | A1 | 1/2012 | Sjursen |
| 2013/0238079 | A1 | 9/2013 | Bingener-Casey |
| 2014/0294214 | A1 | 10/2014 | Zhao |
| 2016/0296755 | A1 | 10/2016 | Van Der Borght |
| 2017/0238079 | A1 | 8/2017 | Smith |

OTHER PUBLICATIONS

Invitation to Pay Additional Fees, Partial Search Report and Provisional Opinion for PCT Application No. PCT/US2018/067908, Mar. 14, 2019, 11 pages.

HEARING DEVICE CABLE

RELATED APPLICATION

This application is a continuation of U.S. application Ser. No. 17/546,702, filed 9 Dec. 2021, which is a continuation of U.S. application Ser. No. 16/235,629, filed 28 Dec. 2018, and entitled HEARING DEVICE CABLE, which claims the benefit of U.S. Provisional Application No. 62/611,346, filed 28 Dec. 2017, and entitled HEARING DEVICE CABLE, which are incorporated herein by reference in their entireties.

FIELD OF THE DISCLOSURE

Embodiments of the present disclosure relate generally to hearing device cables.

BACKGROUND

Hearing devices (e.g., including hearing aids or devices for providing personalized sound to an individual's ear) may be worn, for example, in and/or around an individual's ear and may be contoured with curved surfaces to facilitate comfort in use. For example, hearing aids may be used to assist an individual suffering from hearing loss by transmitting amplified sound directly to the individual's ear canals. Specifically, for example, hearing aids may be in the form of a Receiver in Canal (MC) device or a Behind the Ear (BTE) device. BTE devices may require tubing to direct processed audio from an ear piece (e.g., positioned on top of the ear) to the ear canal. MC devices may require routing the hearing device wires or cables from the speaker inside the ear canal to the device residing behind the ear. The hearing device cable generally follows the contours of the head (e.g., along the ear) prior to an approximately 90 degree turn into the ear canal. This produces a hearing device that substantially extends in all three dimensions and forms a significant bend that may kink and/or tension the cable/tube to create a compound failure mode (e.g., which may result in broken cables/tubes, broken wires, intermittent connections, or any combinations thereof).

With respect to both the RIC device and the BTE device, the cables or tubing may be specifically shaped and sized to best fit the user's anatomy. As a result, multiple sizes and shapes of each hearing device must be manufactured for the multiple different possible user anatomies. As a result, consumer self-fitting may not be practical without having all the different size and shape hearing devices on hand. Even using one of the multiple different shape and sized hearing devices, the hearing device may have slight mismatches to the user's anatomy that affect retention and comfort of the hearing device. Further, each size and shape must also include a mirror image to accommodate for a hearing device in each user's ear (e.g., a hearing device for the right ear and a hearing device for the left ear). Further yet, manufacturing multiple different size and shape hearing devices (as well as left and right variants) may require several handling steps, processes, fixtures, and checks to ensure compliance. Additionally, custom packaging may need to be specifically tailored to each variant of hearing device to ensure protection of the hearing devices during shipment.

With respect to BTE devices, it is important to eliminate variations in acoustic paths that are not accounted for in the programming software. Therefore, typically, the BTE device includes either an earhook, custom length tubing and a 90 degree elbow all compression fit together in varying lengths or a thin tube thread interface, shaped tubing of varying lengths, and a barbed interface all bonded in the left or right configurations. Further, the earhook assemblies are large in cross-section and the overlapping joints from the hook to the tube may draw attention (e.g., giving the BTE device a "stodgy" or "old fashioned" appearance). Further yet, the thin tube assemblies commonly kink during use and transportation, which may severely shorten service life.

SUMMARY

Embodiments described herein may provide a hearing device cable (e.g., a tube) that defines a distinct shape and flexibility to provide a one-size-fits-all (ear anatomies) device. In other words, the hearing device cable may be flexible enough to contour along both left and right ears of different sizes, while still maintaining a stiffness necessary for the hearing device. Further, the hearing device cables (or tubes) may include a superelastic wire contained therein to help define the distinct shape of the hearing device cable.

In one embodiment, a hearing device cable may include a body portion extending between a first end region and a second end region. The body portion may include a first radial portion proximate the first end region and a second radial portion proximate the second end region. The first radial portion may define a radius of curvature that is greater than or equal to a radius of curvature defined by the second radial portion.

In another embodiment, a hearing device cable may include a body portion extending between a first end region and a second end region along a tube centerline. The body portion may include a first radial portion proximate the first end region and a second radial portion proximate the second end region. The tube centerline may lie along an x-y plane between the first and second end regions.

In one or more embodiments, the radius of curvature of the first radial portion may be greater than or equal to 100% and/or less than or equal to 200% of the radius of curvature of the second radial portion. In one or more embodiments, the body portion may define an S-shape such that the first radial portion extends along an arc that curves in a direction opposite an arc along which the second radial portion extends. In one or more embodiments, the body portion may include one or more conductive wires and Kevlar. In one or more embodiments, the body portion may be adapted to fit within a human ear (e.g., left or right ear) such that the first end region is positioned above the human ear and the second end region is positioned within an ear canal of the human ear. In one or more embodiments, the body portion may be adapted to deflect such that a direct distance between the first end region and the second end region increases or decreases (e.g., to fit various sized ears).

In one or more embodiments, the body portion may include a UV resistant material. In one or more embodiments, the body portion may be configured to retain shape after deformation. In one or more embodiments, the cable may be configurable in a relaxed state and a deflected state, wherein a direct distance between the first end region and the second end region may be different in the relaxed state than the deflected state. In one or more embodiments, the body portion may define a passageway extending between the first end region and the second end region. In one or more embodiments, the cable may further include a superelastic wire within the passageway extending between the first end region and the second end region. In one or more embodiments, the cable may further include an ear interface coupled to the second end region of the body portion.

In yet another embodiment, a hearing device cable may include a body portion and a superelastic wire. The body portion may extend between a first end region and a second end region. The body portion may define a passageway extending between the first end region and the second end region. The superelastic wire may be within the passageway extending between the first end region and the second end region (e.g., coupled to each of the first and second end regions).

In one or more embodiments, the superelastic wire may include nitinol. In one or more embodiments, the superelastic wire may be folded at the second end region of the body portion. In one or more embodiments, the cable may further include an ear interface proximate the second end region of the body portion defining a chamfer/taper. In one or more embodiments, the body portion may include a silicone material. In one or more embodiments, the superelastic wire may define a deformation temperature greater than or equal to 500 degrees Fahrenheit.

In one or more embodiments, the body portion may define a constant interior length and inside diameter between the first end region and the second end region. In one or more embodiments, the body portion may include a first radial portion proximate the first end region and a second radial portion proximate the second end region, wherein the first radial portion may define a radius of curvature that is greater than or equal to a radius of curvature defined by the second radial portion. In one or more embodiments, the body portion may include a first radial portion proximate the first end region and a second radial portion proximate the second end region, wherein the tube centerline or curved axis may lie along an x-y plane between the first and second end regions.

The above summary is not intended to describe each embodiment or every implementation. Rather, a more complete understanding of illustrative embodiments will become apparent and appreciated by reference to the following Detailed Description of Exemplary Embodiments and Claims in view of the accompanying figures of the drawing.

BRIEF DESCRIPTION OF THE VIEWS OF THE DRAWING

Exemplary embodiments will be further described with reference to the figures of the drawing, wherein.

Figure 1A:
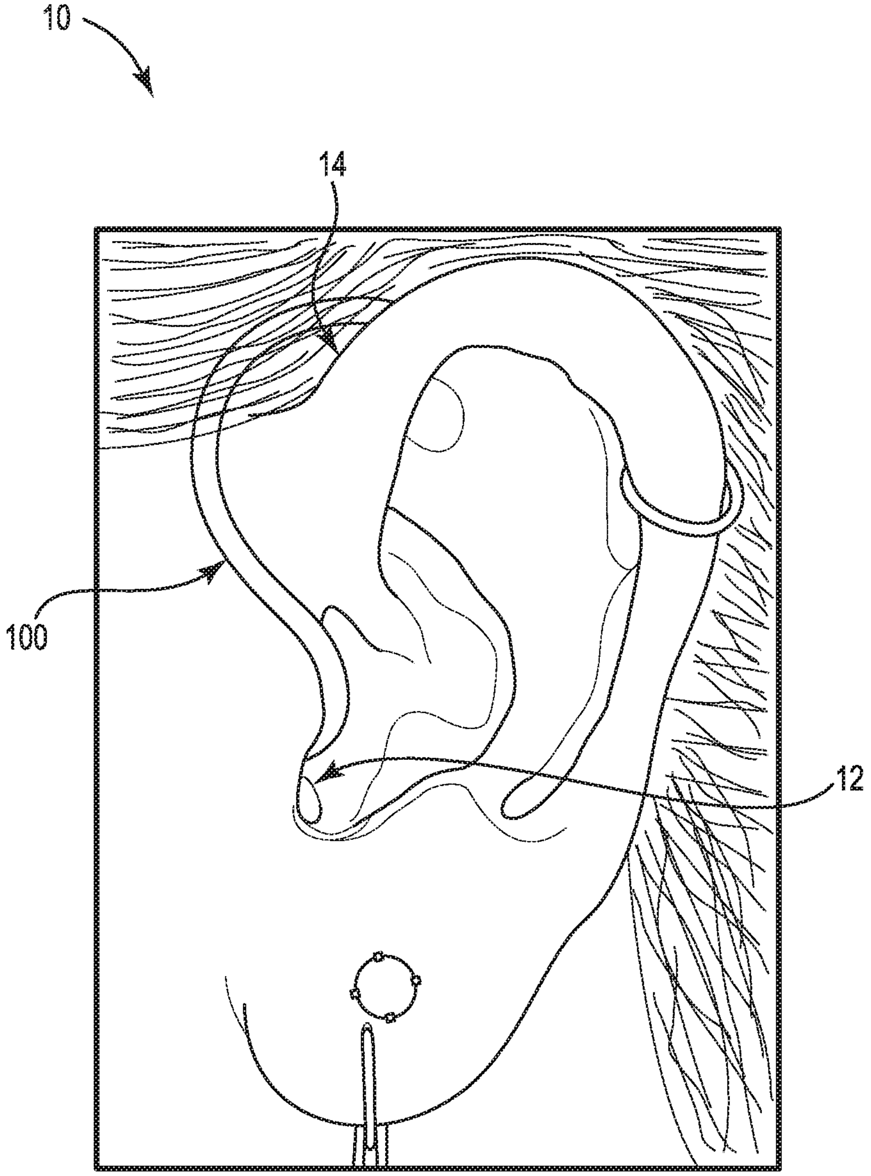
FIGS. 1A-1C are side views of various different human ears including an illustrative hearing device cable positioned thereon.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated. Unless otherwise indicated, all numbers expressing quantities, and all terms expressing direction/orientation (e.g., vertical, horizontal, parallel, perpendicular, etc.) in the specification and claims are to be understood as being modified in all instances by the term "about."

Generally speaking, embodiments of the present disclosure may be directed to hearing device cables that define a distinct shape (e.g., an S-shape) such that the hearing device cable expands or contracts in multiple directions to allow for the adaption and compliance to different ear anatomies. In other words, the distance between each end of the hearing device cable remains constant (e.g., measured along the cable), but the cable flexes to accommodate various sized ears. Furthermore, the hearing device cable lies in a generally planar dimension when the cable is in a relaxed state. In other words, the hearing device cable only extends generally in two coordinate directions and does not substantially extend into the third coordinate direction that is orthogonal to the plane in which the cable lies. As a result, the hearing device cable, as described herein, does not extend at a 90-degree angle that may be susceptible to kinking or breaking.

Specifically, the hearing device cable may define an S-shape including an upper curve (e.g., the portion to be positioned proximate the top of the ear) that is larger than a lower curve (e.g., the portion to be positioned proximate the ear canal). These curved portions of the hearing device cable may allow for expansions and contractions of the cable. The lower curve may permit a gradual in-situ bend into the ear canal to, e.g., minimize the resulting projection from the ear while reducing the stress inflected on the cable and components (e.g., wires) contained therein. The upper curve may have a slightly larger bend to accommodate for extending around the ear to the top of the ear. As such the upper and lower curves may help to improve comfort to the user by gently conforming to the anatomy of the user.

The hearing device cables may contain any components to help define the distinct shape. For example, in some embodiments, the cable may include an extruded material (e.g., extruded Pebax) that encases multiple wires and Kevlar strands/braids to enhance pull strength and define the flexibility/rigidity of the cable (while decreasing the possibility of broken wires due to overextension). In other embodiments, the hearing device cable may be a tube that includes a transparent silicone (or equivalent TPE) soft flexible tube placed over a pre-shaped superelastic nitinol wire that provides structure to the tube. In other words, the superelastic wire remains within the tube of the hearing device cable to act as an internal "spine" that forms the distinct shape (e.g., the S-shape).

Figure 1B:
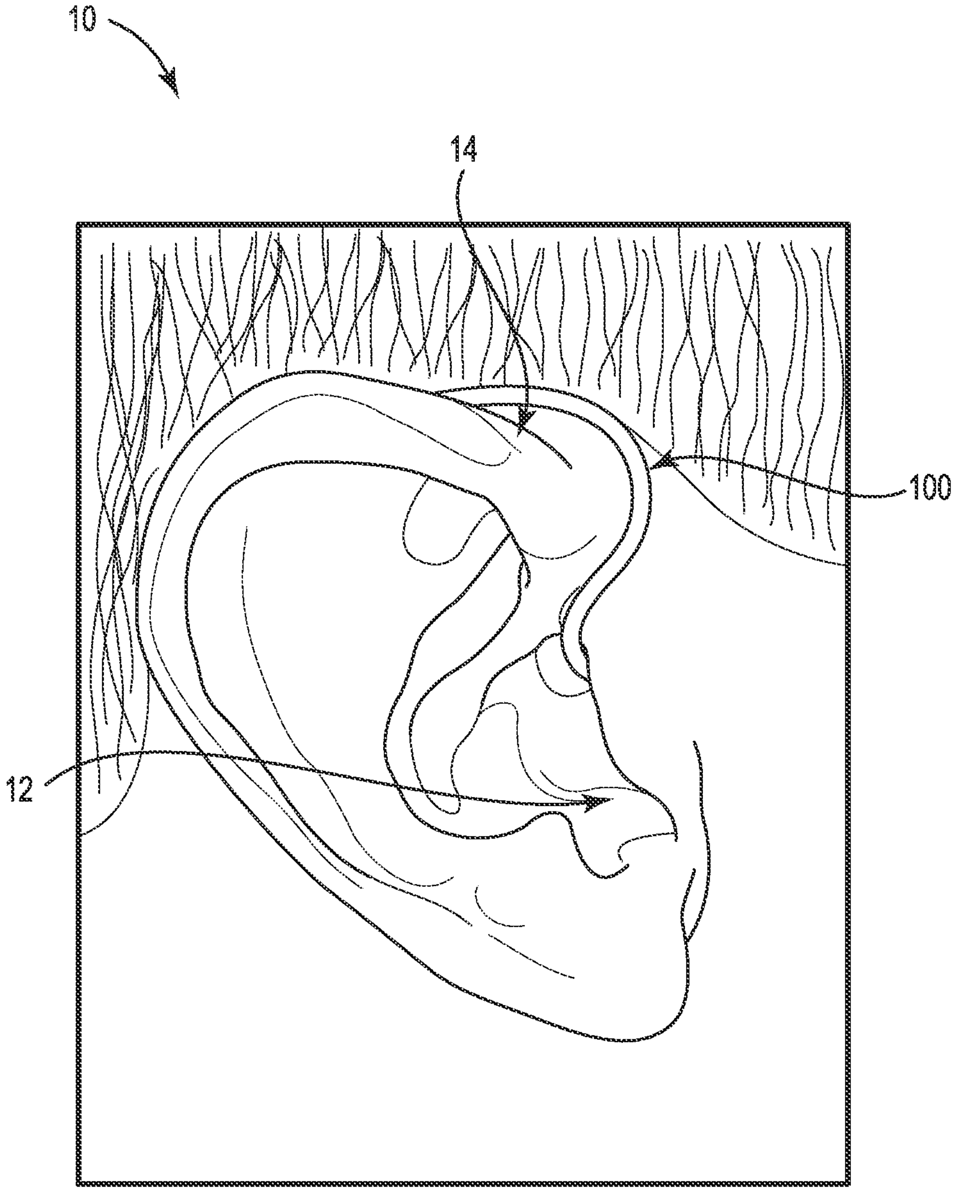
Figure 1C:
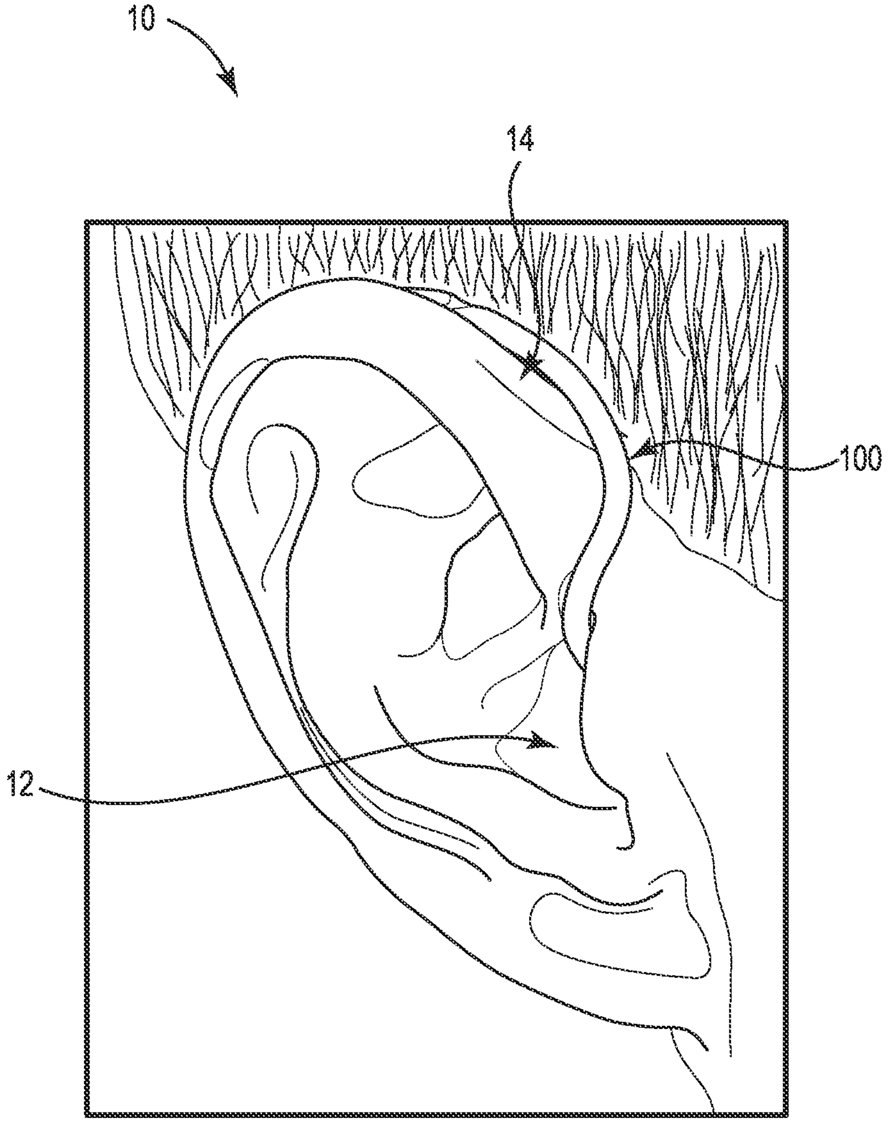

With reference to the figures of the drawing, wherein like reference numerals designate like parts and assemblies throughout the several views, FIGS. 1A-1C illustrate various different human ears 10 including an illustrative hearing device cable 100 positioned thereon. The hearing device cable 100 extends between an ear canal 12 and a location above the ear (e.g., the pinna 14) and adapts to various distances between the ear canal 12 and the pinna 14 depending on the user. Because the hearing device cable 100 defines an upper curve and a lower curve, as described further herein, the hearing device cable 100 may extend or contract to fit the ear anatomy of any user as shown in FIGS. 1A-1C. Further, the shape of the hearing device cable 100 is suitable for either the left or right ear. For example, the hearing device cable 100 used in FIGS. 1B and 1C is positioned on a right ear and the hearing device cable 100 used in FIG. 1A is positioned on a left ear. This applicability of a single hearing device cable 100 to either of the left ear or the right ear may eliminate the need for separate left and right cables (e.g., may eliminate the need for two distinct hearing device cables). As a result, the hearing device cable 100 may be described as a "universal solution" or one-size-fits-all device (e.g., due to the cable/tube geometry) that may enable a better consumer experience by eliminating the need for fitting the hearing device cable to the user (e.g., to accommodate the shape and/or size of the ear or to fit the left/right ear). Further, the hearing device cable 100 may allow device compatibility with small and thin recharging accessories.

Figure 2A:
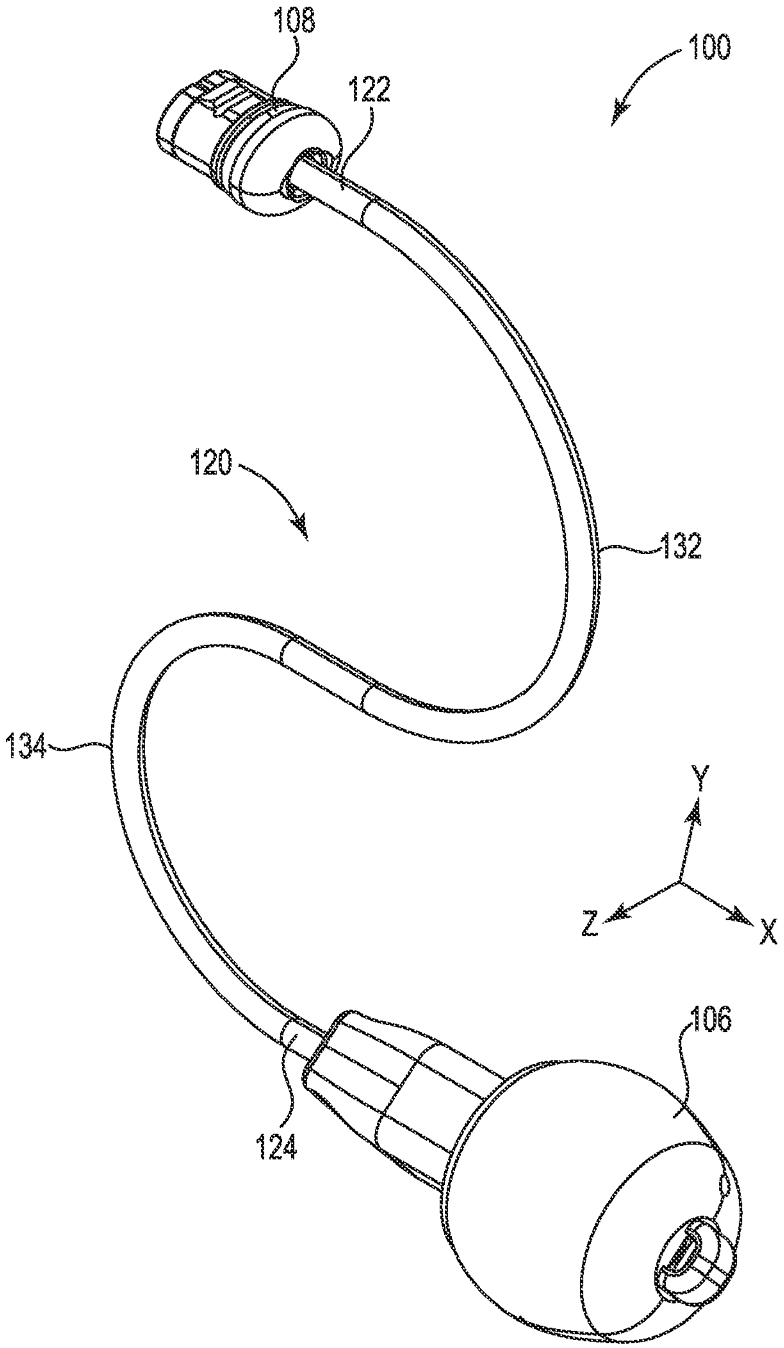
FIG. 2A is a perspective view of an illustrative hearing device cable and in accordance with embodiments of the present disclosure.
Figure 2B:
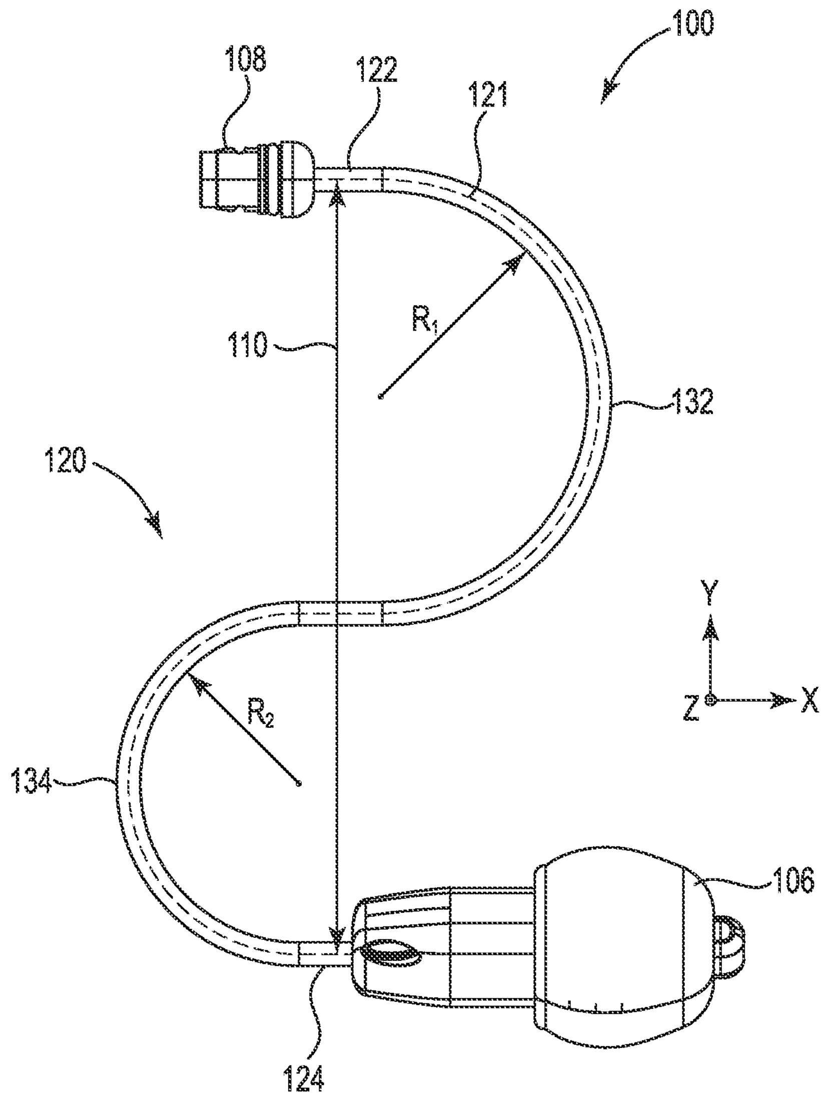
FIG. 2B is a side view of the hearing device cable of FIG. 2A.
Figure 2C:
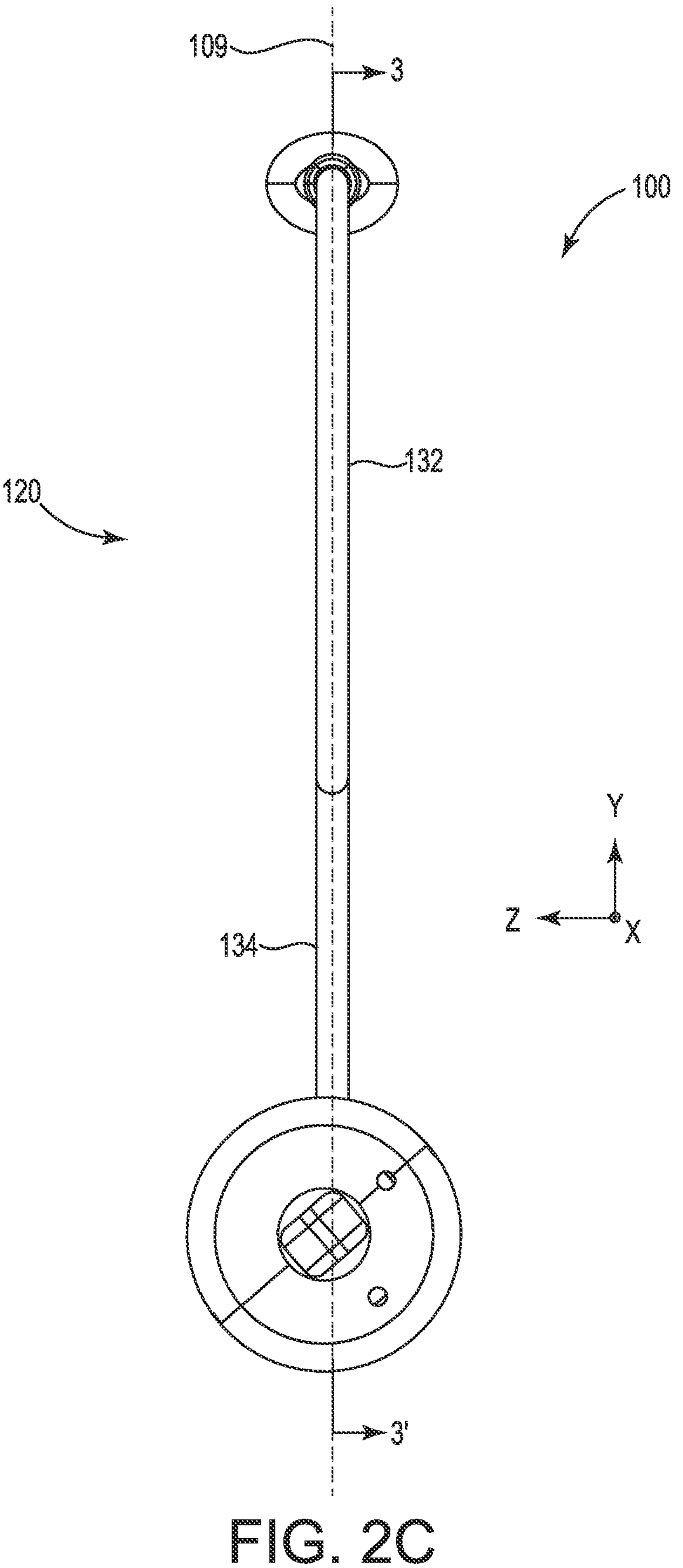
FIG. 2C is a front view of the hearing device cable of FIG. 2A.
Figure 3:
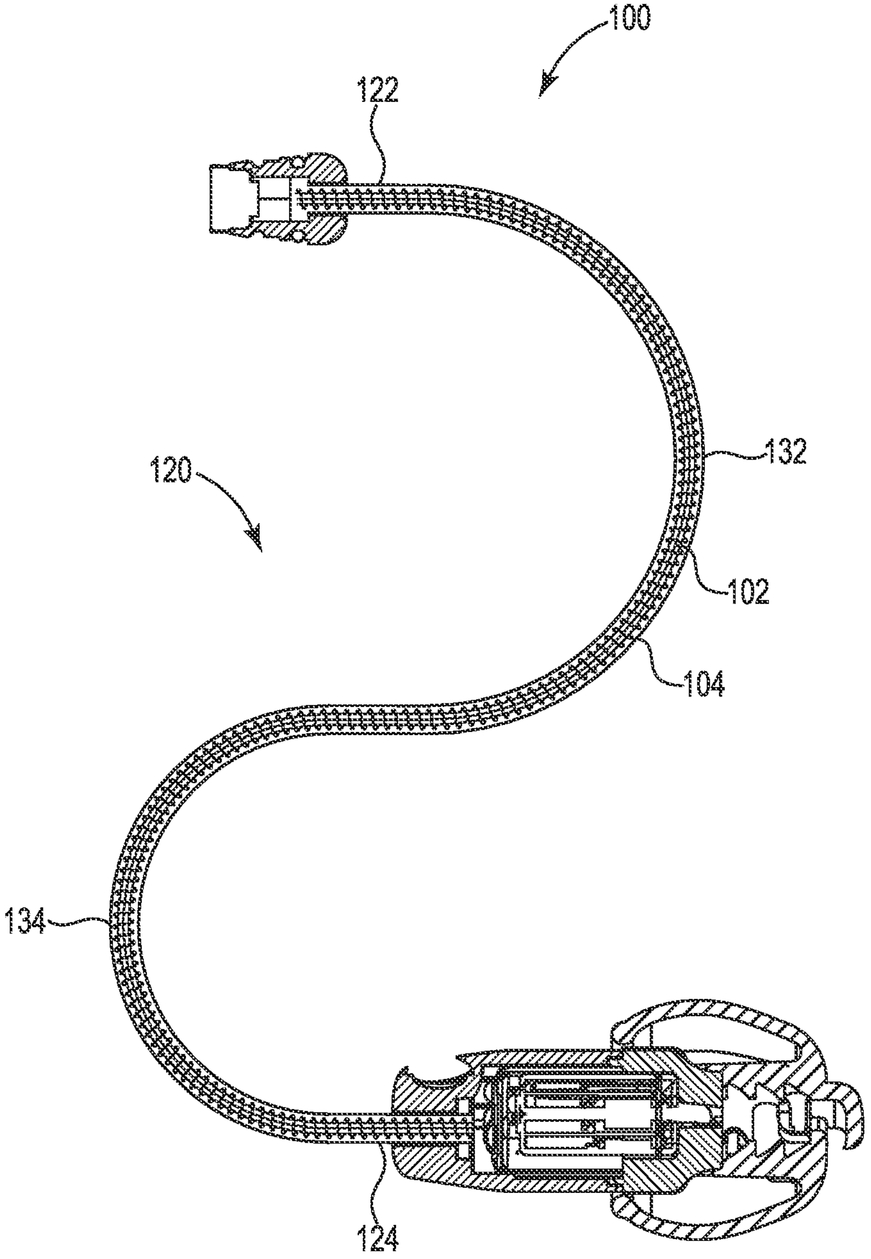
FIG. 3 is a cross-sectional view of the hearing device cable of FIG. 2A taken along line 3-3' of FIG. 2C.

As shown in FIGS. 2-3, the hearing device cable 100 may include a body portion 120 extending between a first end region 122 and a second end region 124. Specifically, the body portion 120 may extend between the first end region 122 and the second end region 124 along a tube centerline 121 or a curved axis (e.g., as shown in FIG. 2B). The body portion 120 may be any suitable cable or tube used with a hearing device. For example, the body portion 120 may include an extruded cable that increases environmental resistance because, e.g., both ends are sealed. Specifically, the body portion 120 may be a conduit for wires (e.g., for a RIC device) and may be shaped from the external jacket via heat forming. Further, the body portion 120 may include one or more conductive wires 102 and Kevlar 104 (e.g., as shown in FIG. 3). The one or more conductive wires 102 may operably connect the ear piece and the receiver and the Kevlar 104 (as well as the one or more conductive wires 102) may increase the pull strength (e.g., up to 20 pounds of force) and ruggedness (e.g., improved tensile strength) of the body portion 120. In other embodiments, the body portion 120 may include a tube (e.g., formed from silicone) that defines a passageway therethrough (e.g., between the first end region 122 and the second end region 124). In some embodiments, the body portion 120 may include a UV resistant material. Regardless of the components of the body portion 120, the body portion 120 may always maintain its shape with minimal resistance (e.g., after deformation).

The body portion 120 may extend a length along the tube centerline 121 between the first and second end regions 122, 124. The length of the body portion 120 may remain constant regardless of the deformation of the body portion 120. As such, internal components contained within the body portion 120 (e.g., one or more conductive wires 102) may not be strained due to deformation of the body portion 120 and sound characteristics that depend on a set distance (e.g., BTE devices) will not be affected by any deformation of the body portion 120.

The body portion 120 may include a first radial portion 132 proximate the first end region 122 and a second radial portion 134 proximate the second end region 124. The first radial portion 132 may define a radius of curvature R1 and the second radial portion 134 may define a radius of curvature R2. Further, it may be described that the body portion 120 defines an S-shape such that the first radial portion 132 extends along an arc that curves in a direction opposite an arc along which the second radial portion 134 extends. In other words, as shown in FIG. 2B, a concave side of the first radial portion 132 (e.g., facing left in FIG. 2B) faces opposite a concave side of the second radial portion 134 (e.g., facing right in FIG. 2B).

The hearing device cable 100 may be configured or adapted into a relaxed state and a deflected state. For example, when the hearing device cable 100 is not positioned in the ear of the user (and no external force is applied on the cable 100), the hearing device cable 100 may be considered to be in the relaxed state. When the hearing device cable 100 is in the relaxed state, the body portion 120 may generally lie in a plane. Specifically, the tube centerline 121 along which the body portion 120 extends may be considered to remain in the plane between the first end region 122 and the second end region 124. For example, as shown in FIGS. 2A-2C, the tube centerline 121 of the body portion 120 extends along the x-y plane 109 (e.g., as shown in FIG. 2C). As a result, when the hearing device cable 100 is in the relaxed state, the body portion 120 only extends along two dimensions. In other words, the body portion 120 (e.g., the tube centerline 121) does not extend into the z-dimension. This "flat" shape (e.g., two-dimensional shape) of the body portion 120 may, e.g., simplify manufacturing and shipping, lessen the occurrence of cable damage when handling (e.g., when compared to cables that have a 90-degree bend), allow the body portion to be more rugged/robust and reduce the incidence of pinched/broken cables, reduce stress/strain on the cable by permitting gradual adaption to in-situ wear, reduce stress/strain when in storage or transportation, etc.

When the hearing device cable 100 is located and positioned in the ear of a user, the hearing device cable 100 may be considered to be in the deflected state. The first and second radial portion 132, 134 may adapt and comply to the ear of the user by deforming the body portion 120 to, e.g., increase comfort and fit to the user. As a result, when the hearing device cable 100 is in the deflected state, the body portion 120 (e.g., the tube centerline 121) may no longer only extend along the x-y plane (e.g., the body portion 120 may deflect along the z-dimension due to the anatomy of a human ear). The body portion 120 deflects with a minimal resistance (e.g., in length and orientation) such that the body portion 120 deforms as necessary to remain comfortable to the user, but the body portion 120 reverts back to a two-dimensional cable lying substantially in a plane (e.g., along tube centerline 121) when removed from the ear (e.g., the body portion 120 retains its original shape after deformation). In other words, the body portion 120 does not significantly deform after removal from the ear. Further, when the hearing device cable 100 is placed within a corresponding case or charger, the hearing device cable 100 may straighten out or revert to lying in a plane (e.g., due to interaction with the case or charger). As a result, the hearing device cable 100 may be transported or stored as a generally two-dimensional cable when not in use.

The shape of each of the first and second radial portions 132, 134 may allow the body portion 120 to deform as needed in any direction to fit different sized ears (e.g., for an adult or a pediatric configuration). Specifically, the first radial portion 132 may be sized and shaped to conform to the pinna (e.g., above the ear) to enhance positioning of the device (e.g., the ear housing) behind the ear. The second radial portion 134 may be sized and shaped to extend into the ear canal (e.g., to the ear piece or bud) and extend towards an outer edge of the ear. Each of the first and second radial portions 132, 134 may be sized to minimize the amount of material that extends outwards from the ear (e.g., to keep the body portion 120 tighter to the head, less protrusion from the ear).

Further, the first and second radial portions may be sized relative to one another to optimize the fit of the body portion 120 within the ear. For example, the radius of curvature R1 of the first radial portion 132 may be greater than or equal to the radius of curvature R2 of the second radial portion 134. For example, the radius of curvature R1 of the first radial portion 132 may be greater than or equal to 100% and/or less than or equal to 200% of the radius of curvature R2 of the second radial portion 134. Specifically, the radius of curvature R1 of the first radial portion 132 may be at least 33% larger than the radius of curvature R2 of the second radial portion 134. In one or more embodiments, the radius of curvature R1 of the first radial portion 132 may be about greater than or equal to 0.1 inches and/or less than or equal to 2.5 inches and the radius of curvature R2 of the second radial portion 134 may be about greater than or equal to 0.1 inches and/or less than or equal to 2.5 inches. In other embodiments, the radius of curvature R1 of the first radial portion 132 may be less than the radius of curvature R2 of the second radial portion 134.

The body portion 120 may be adapted or configured to deflect (e.g., when positioned in a human ear) such that a direct distance 110 between the first end region 122 and the second end region 124 increases or decreases (e.g., to fit various sized ears). The shape of the first and second radial portions 132, 134 allow the body portion to deflect for any necessary configuration. For example, the radii of curvature R1, R2 may be able to easily increase or decrease due to their curved shape. Further, the direct distance 110 between the first and second end regions 122, 124 may be different when the hearing device cable 100 is in the relaxed state than when the hearing device cable 100 is in the deflected state. It is noted that while the direct distance 110 may change when the body portion 120 deflects, the length of the body portion 120 along the tube centerline 121 between the first and second end regions 122, 124 will always remain constant. This constant internal length (as well as a constant inside diameter of a cable 100 that includes a passageway) between the first and second end regions 122, 124 may permit a more accurate modeling of acoustic effects, which may have a much higher degree of accuracy and sound quality from any programming software.

The body portion 120 may be adapted or configured to fit within a human ear (e.g., either of the left or right ear) such that the first end region 122 is positioned above the ear and the second end region 124 is positioned within an ear canal. Additionally, the hearing device may include an ear interface 106 (e.g., an ear bud or coupled to an ear bud) coupled proximate the second end region 124 of the body portion 120 and a connector 108 (e.g., to connect a housing of a hearing device to the body portion 120) coupled proximate the first end region 122 of the body portion 120. In one or more embodiments, the ear interface 106 may be configured to fit a variety of different sized ear buds (e.g., through barbs or bonding). In some embodiments, the body portion 120 may not include a connector 108 (e.g., proximate the first end region 122), but rather, may include a permanent cross-pinned cable assembly.

Figure 4A:
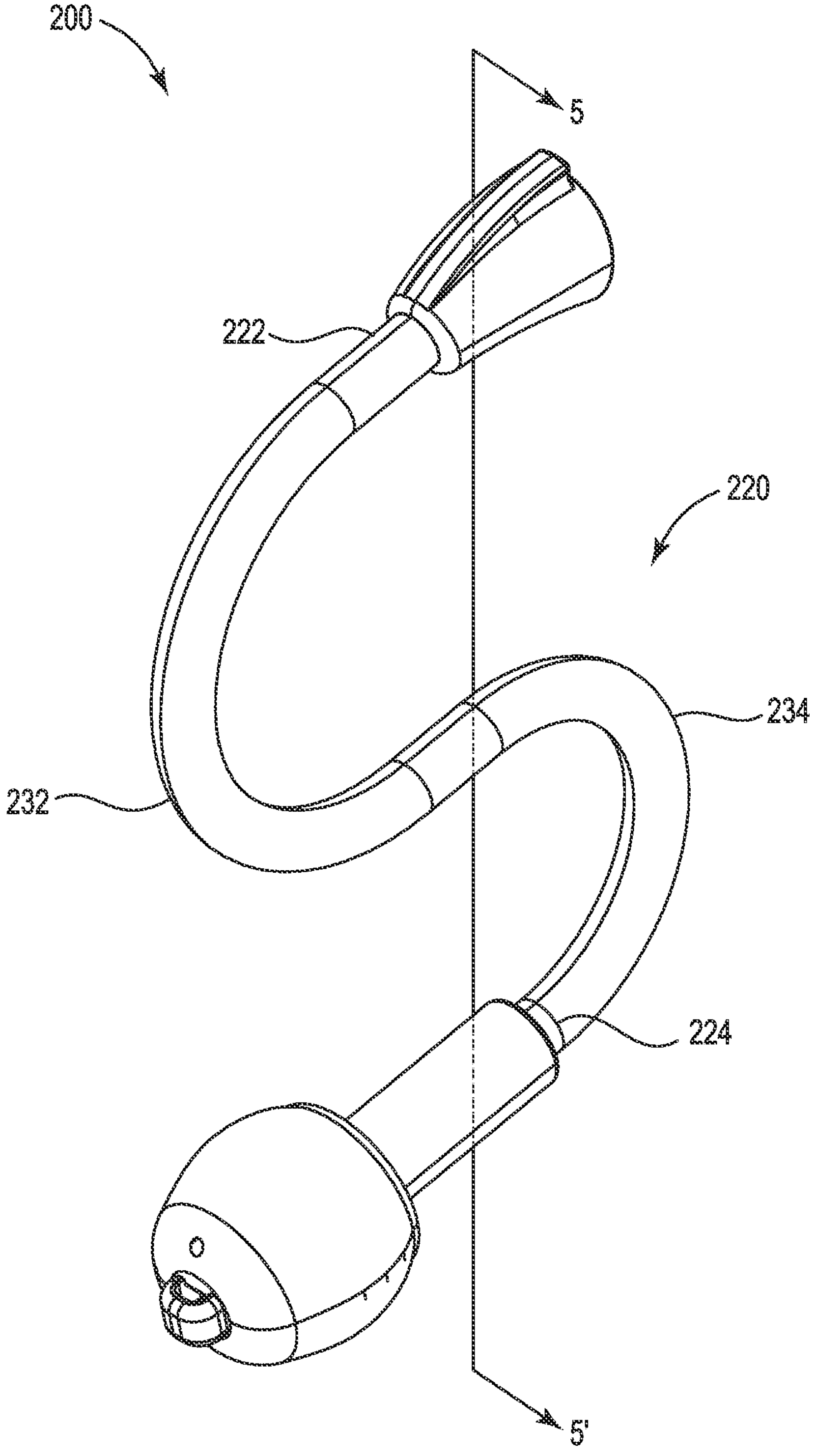
FIG. 4A is a perspective view of another illustrative hearing device cable and in accordance with embodiments of the present disclosure.
Figure 4B:
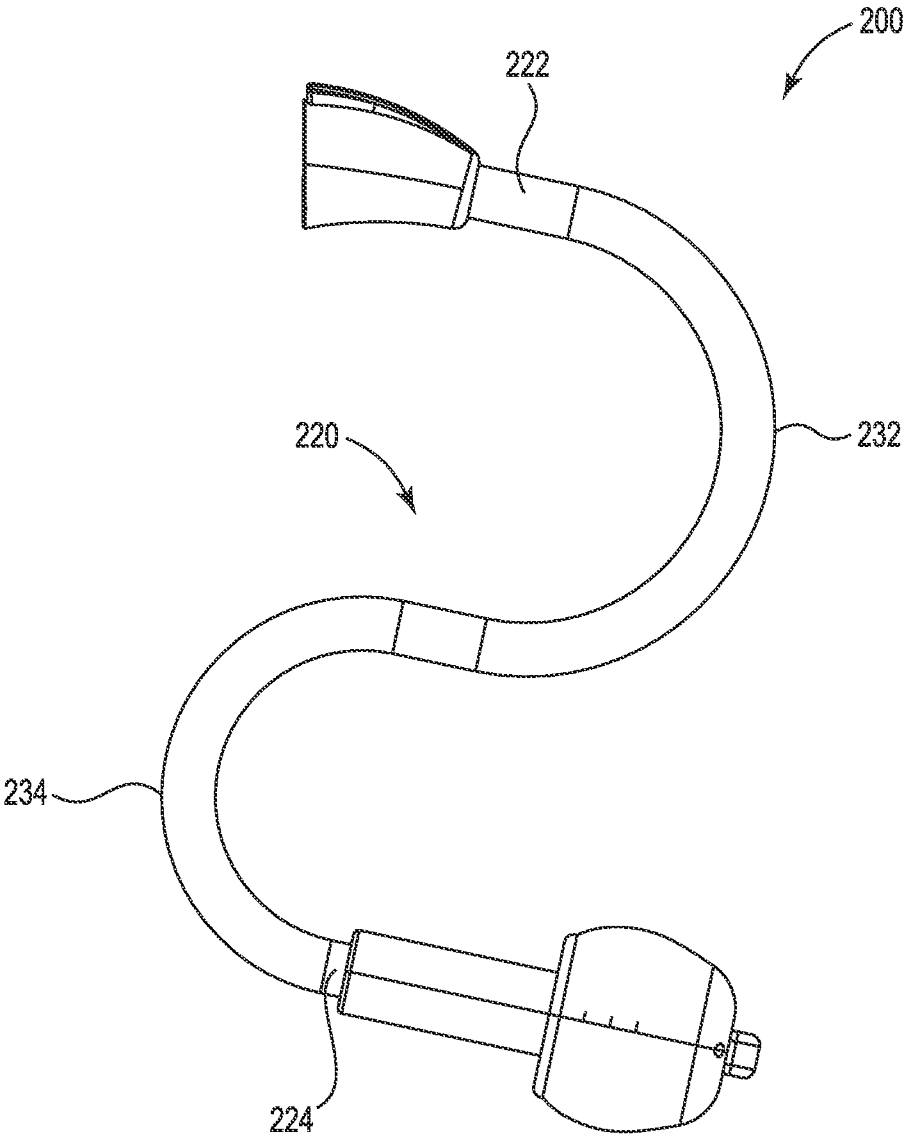
FIG. 4B is a side view of the hearing device cable of FIG. 4A.

Another illustrative embodiment of a hearing device cable 200 is shown in FIGS. 4-5. Each of the features described with respect to FIGS. 2-3 also apply to the hearing device cable 200. Likewise, each of the features described with respect to FIGS. 4-5 may apply to the hearing device cable 100. The hearing device cable 200 (e.g., for a BTE device) may be a conduit that transports audio and may be internally shaped by a memory alloy wire (e.g., the superelastic wire 140 described below). For example, the hearing device cable 200 may include a body portion 220 (e.g., a tube) that extends along a tube centerline or curved axis between a first end region 222 and a second end region 224 (e.g., with the tube centerline of the hearing device cable 200 extending only within in a plane when in a relaxed state). Additionally, the body portion 220 may include a first radial portion 232 proximate the first end region 222 and a second radial portion 234 proximate the second end region 224. The hearing device may also include an ear interface 206 (e.g., an ear bud) coupled proximate the second end region 224 of the body portion 220 and a connector 208 (e.g., to connect an ear piece to the body portion 220) coupled proximate the first end region 222 of the body portion 220. In some embodiments, the design of the body portion 220 may be adapted to a variety of device mounting strategies (e.g., ball and socket, barb fitting, threaded, ¼ disconnects) without changing the aesthetics of the cable 200.

Figure 5A:
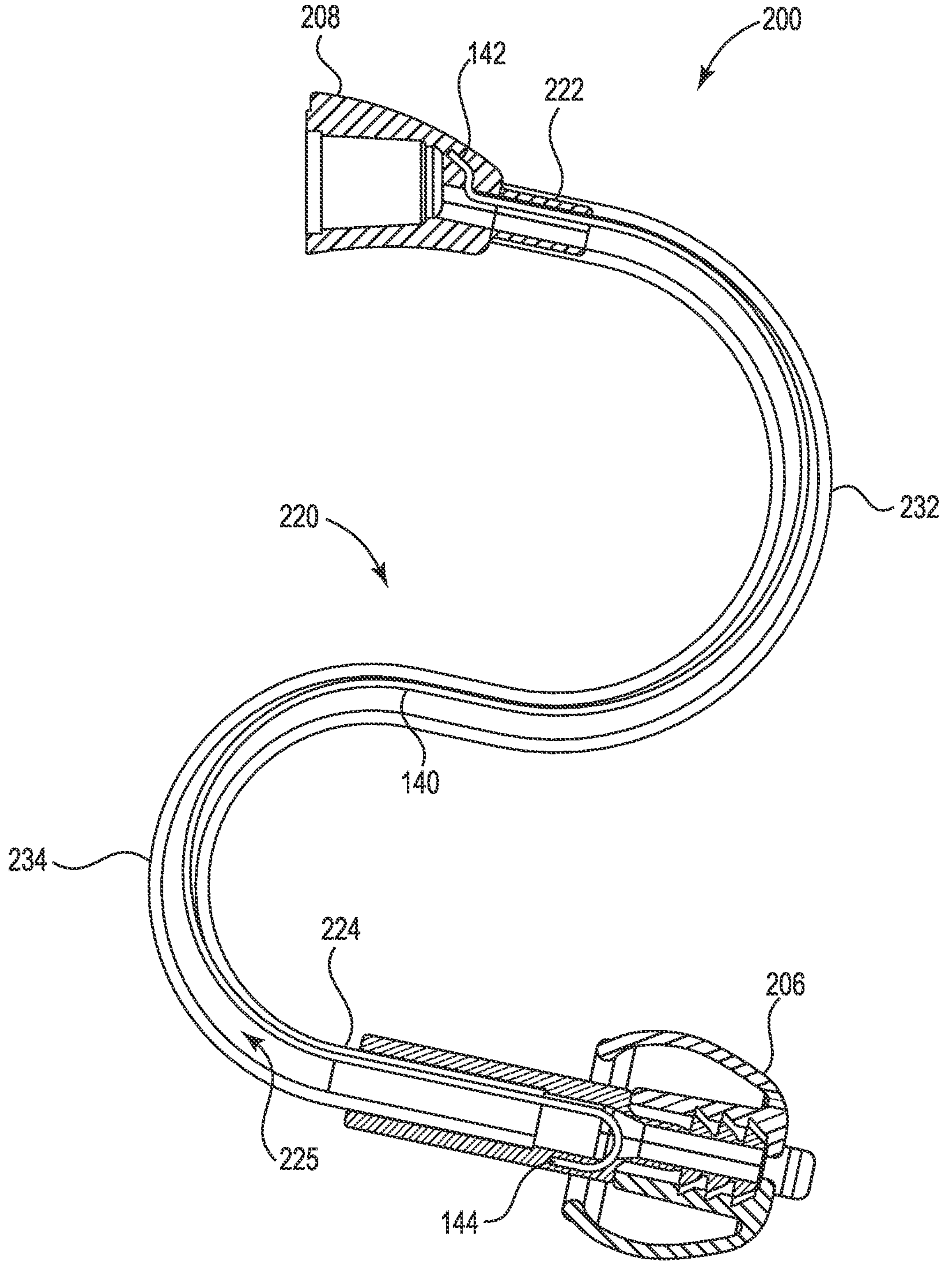
FIG. 5A is a cross-sectional view of the hearing device cable of FIG. 4A taken along line 5-5' of FIG. 4A.
Figure 5B:
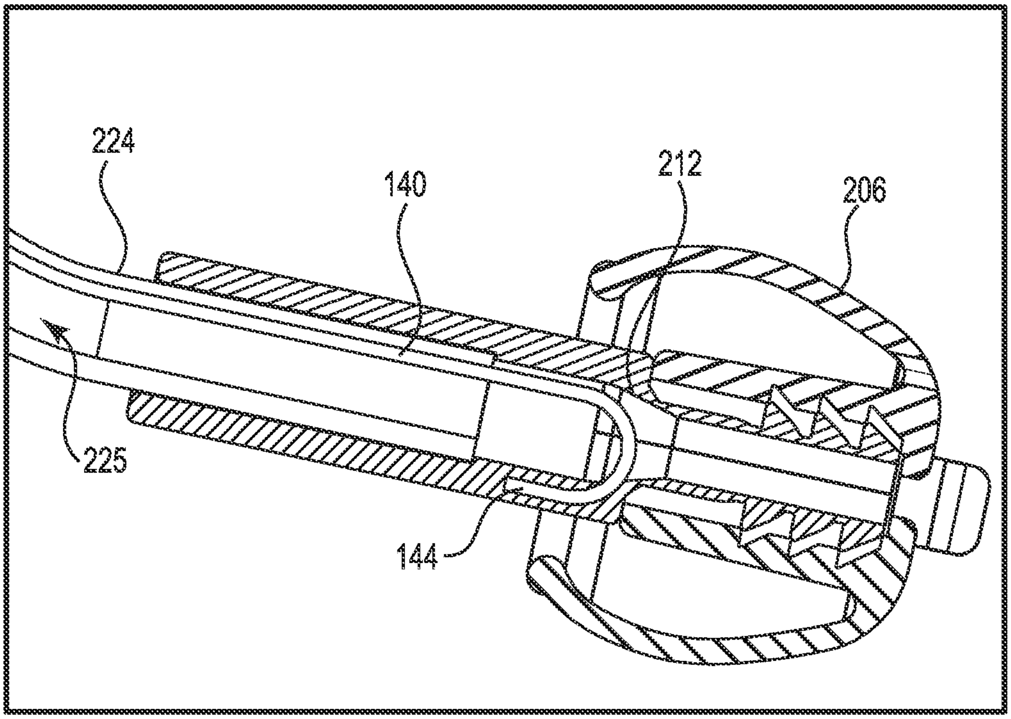
FIG. 5B is an enlarged view of the hearing device cable of FIG. 5A.

As shown in FIG. 5A, the body portion 220 may define a passageway 225 (e.g., for conducting processed sound) extending between the first end region 222 and the second end region 224. Furthermore, the hearing device cable 200 may include a superelastic wire 140 (e.g., a nitinol wire) located within the passageway 225 and extending between a first wire end region 142 (e.g., proximate the first end region 222) and a second wire end region 144 (e.g., proximate the second end region 224). The superelastic wire 140 provides shape to the cable 200 from the inside-out rather than from the outside in (e.g., which would be the case for rigid molded or heat formed tubes). This may provide additional comfort and may help adapt to the body, while expanding the number of materials available to construct the hearing device cable 200 (e.g., because the multiple materials may be used to form the body portion 220). Furthermore, the consistency of the outside diameter of the hearing device cable 200 from the first end region 220 to the second end region 222 may draw less attention to the design configuration.

The superelastic wire 140 may include any variety of materials that help define the shape of the body portion 220 and remain coupled therein. For example, the superelastic wire 140 may include nitinol. A nitinol memory wire may retain its shape, allowing usage of a soft flexible tubing for the hearing device cable 200 to, e.g., enhance comfort while overcoming the most common thin tube failure modes. The nitinol may minimally affect the acoustics passing through the passageway 225 of the body portion 220 (e.g., while permitting a wider selection of tube materials, wall sections, and diameters without sacrificing fit, comfort, or kink resistance). In one or more embodiments, the body portion 220 may be pinched by fingers during insertion or removal from the ear, and the body portion 220 may return to an un-kinked cross-section (e.g., due to the elastomeric nature of the superelastic wire 140 contained therein). In other words, because the body portion 220 may include a superelastic wire 140 contained therein, the body portion 220 may provide a robust design that may not collapse or kink the body portion 220 or alter the shape of the superelastic wire 140. Furthermore, the superelastic wire 140 may permit the body portion 220 to be cleaned with a variety of different methods. For example, the body portion 220 may be cleaned using boiling water without losing its shape or integrity because the superelastic wire 140 defines a deformation temperature greater than or equal to 500 degrees Fahrenheit, greater than or equal to 700 degrees Fahrenheit, greater than or equal to 900 degrees Fahrenheit, etc.

The first wire end region 142 may be coupled (e.g., to the body portion 220) proximate the first end region 222 and the second wire end region 144 may be coupled (e.g., to the body portion 220 or the ear interface 206) proximate the second end region 224 (e.g., with the ear interface 206). In one or more embodiments, the second wire end region 144 may be folded or hooked proximate the ear interface 206 (e.g., as shown in enlarged view FIG. 5B). The superelastic wire 140 may be folded or hooked to prevent the terminal end of the super elastic wire 140 from extending outward from the body portion 220 and potentially creating a point that could be exposed to the ear. As a result, the second wire end region 144 may fold back towards the passageway 225 to create a smoother end. Further, the ear interface 206 may define a chamfer or taper proximate the passageway 225 such that the folded portion of the superelastic wire 140 may be prevented from pushing through the ear interface 206 and into a user's ear (e.g., because the passageway 225 at the ear interface 206 may be narrower than the width of the superelastic wire 140 at the fold).

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A receiver in canal (RIC) device comprising:
a hearing device cable comprising:
a body portion extending between a first end region and a second end region, wherein the body portion comprises a first radial portion proximate the first end region and a second radial portion proximate the second end region,
wherein the first end region is adapted to be positioned above the human ear and the second end region is adapted to be positioned within an ear canal of the human ear,
wherein the first radial portion defines a radius of curvature that is greater than or equal to a radius of curvature defined by the second radial portion, wherein the body portion defines an S-shape such that the first radial portion extends along an arc that curves in a direction opposite an arc along which the second radial portion extends.

2. The RIC device of claim 1, wherein the radius of curvature of the first radial portion is greater than or equal to 100% and less than or equal to 200% of the radius of curvature of the second radial portion.

3. The RIC device of claim 1, further comprising an ear interface coupled to the second end region of the body portion.

4. The RIC device of claim 1, further comprising a connector coupled to the first end region of the body portion, wherein the connector is adapted to attach to a housing of a hearing device.

5. The RIC device of claim 1, wherein the hearing device cable is configurable in a relaxed state and a deflected state, wherein a direct distance between the first end region and the second end region is different in the relaxed state than the deflected state.

6. The RIC device of claim 1, wherein the body portion defines a passageway extending between the first end region and the second end region.

7. The RIC device of claim 6, further comprising a superelastic wire within the passageway extending between the first end region and the second end region.

8. The RIC device of claim 7, wherein the superelastic wire comprises nitinol.

9. The RIC device of claim 7, wherein the superelastic wire is folded at the second end region of the body portion.

10. The RIC device of claim 7, wherein the superelastic wire defines a deformation temperature greater than or equal to 500 degrees Fahrenheit.

11. The RIC device of claim 1, wherein the body portion defines a constant interior length and inside diameter between the first end region and the second end region.

12. The RIC device of claim 1, wherein the body comprises a silicone material.

13. The RIC device of claim 1, wherein the body portion comprises one or more conductive wires and Kevlar.

14. The RIC device of claim 1, wherein the body portion comprises a UV-resistant material.

15. A receiver in canal (RIC) device comprising:
a hearing device cable comprising:
a body portion extending between a first end region and a second end region, wherein the body portion comprises a first radial portion proximate the first end region and a second radial portion proximate the second end region,
wherein the first radial portion defines a radius of curvature that is greater than or equal to a radius of curvature defined by the second radial portion, wherein the body portion defines an S-shape such that the first radial portion extends along an arc that curves in a direction opposite an arc along which the second radial portion extends, wherein the radius of curvature of the first radial portion is greater than or equal to 100% and less than or equal to 200% of the radius of curvature of the second radial portion.

16. The RIC device of claim 15, further comprising an ear interface coupled to the second end region of the body portion.

17. The RIC device of claim 15, further comprising a connector coupled to the first end region of the body portion, wherein the connector is adapted to attach to a housing of a hearing device.

18. The RIC device of claim 15, wherein the body portion defines a passageway extending between the first end region and the second end region.

19. The RIC device of claim 15, wherein the body portion extends along a tube centerline, wherein the tube centerline lies along an x-y plane between the first and second end regions such that the hearing device cable lies in a generally planar dimension when the hearing device cable is in a relaxed state.

20. The RIC device of claim 15, wherein the body portion defines a constant interior length and inside diameter between the first end region and the second end region.

* * * * *